(12) United States Patent
Bartosik

(10) Patent No.: US 7,146,317 B2
(45) Date of Patent: Dec. 5, 2006

(54) SPEECH RECOGNITION DEVICE WITH REFERENCE TRANSFORMATION MEANS

(75) Inventor: Heinrich Franz Bartosik, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 764 days.

(21) Appl. No.: 09/790,420

(22) Filed: Feb. 22, 2001

(65) Prior Publication Data

US 2001/0025240 A1 Sep. 27, 2001

(30) Foreign Application Priority Data

Feb. 25, 2000 (EP) .................................. 00890057

(51) Int. Cl.
*G10L 15/20* (2006.01)
(52) U.S. Cl. ..................................... 704/234
(58) Field of Classification Search ................ 704/233, 704/234, 203, 204, 224
See application file for complete search history.

(56) References Cited

U.S. PATENT DOCUMENTS

| | | | | |
|---|---|---|---|---|
| 5,890,113 A | | 3/1999 | Takagi ......................... | 704/231 |
| 6,026,359 A | * | 2/2000 | Yamaguchi et al. ........ | 704/256 |
| 6,038,528 A | * | 3/2000 | Mammone et al. ......... | 704/203 |
| 6,151,573 A | * | 11/2000 | Gong ......................... | 704/256 |
| 6,343,267 B1 | * | 1/2002 | Kuhn et al. .................. | 704/222 |
| 6,529,872 B1 | * | 3/2003 | Cerisara et al. ............. | 704/250 |

FOREIGN PATENT DOCUMENTS

WO     WO9935640     7/1999

OTHER PUBLICATIONS

Soulas et al.; "Adapting PSN Recognition Models to the GSM Environment by Using Spectral Transformation"; IEEE International Conference on Acoustics, Speech, and Signal Processing (ICASSP), US, Los Alamitos, IEEE Comp. Soc. Press, Apr. 1997, pp. 1003-1006, XP000822619.

* cited by examiner

*Primary Examiner*—Abul K. Azad

(57) ABSTRACT

A speech recognition device (8), to which can be applied over a first receive channel (21) and a second receive channel (25, 28) speech information (SI) that is colored by the respective receive channel (21, 25, 28), comprises reference storage means (36) for storing reference information (RI1) that features the type of pronunciation of words by a plurality of reference speakers and receive channel adaptation means (30, 38, 44) for adapting the stored reference information (RI, ARI) to a first or second receive channel (21, 25, 28) used by a user and user adaptation means (37) for adapting the stored reference information (RI1, RI2, RI3) to the type of pronunciation of words by the user of the speech recognition device (8) and speech recognition means (29) for recognizing text information (TI) to be assigned to the fed speech information (SI), while reference information (ARI1, ARI2, ARI3) adapted by the receive channel adaptation means (30, 38, 44) and by the user adaptation means (37) is evaluated, where now the receive channel adaptation means (30, 38, 44) include reference transformation means (T1-2, T1-3, T2-3) which are arranged for transforming first reference information (RI1, ARI1) adapted to the first receive channel (21) into second reference information (RI2, RI3, ARI2, ARI3) adapted to the second receive channel (25, 28) in accordance with a transformation matrix (T1-2, T1-3, T2-3) and where the adapted first reference information (RI1, ARI1) to be transformed by the reference transformation means (T1-2, T1-3, T2-3) may, but need not, already have been adapted to the user by the user adaptation means (37).

10 Claims, 2 Drawing Sheets

SPEECH RECOGNITION DEVICE WITH REFERENCE TRANSFORMATION MEANS

Figure 1:
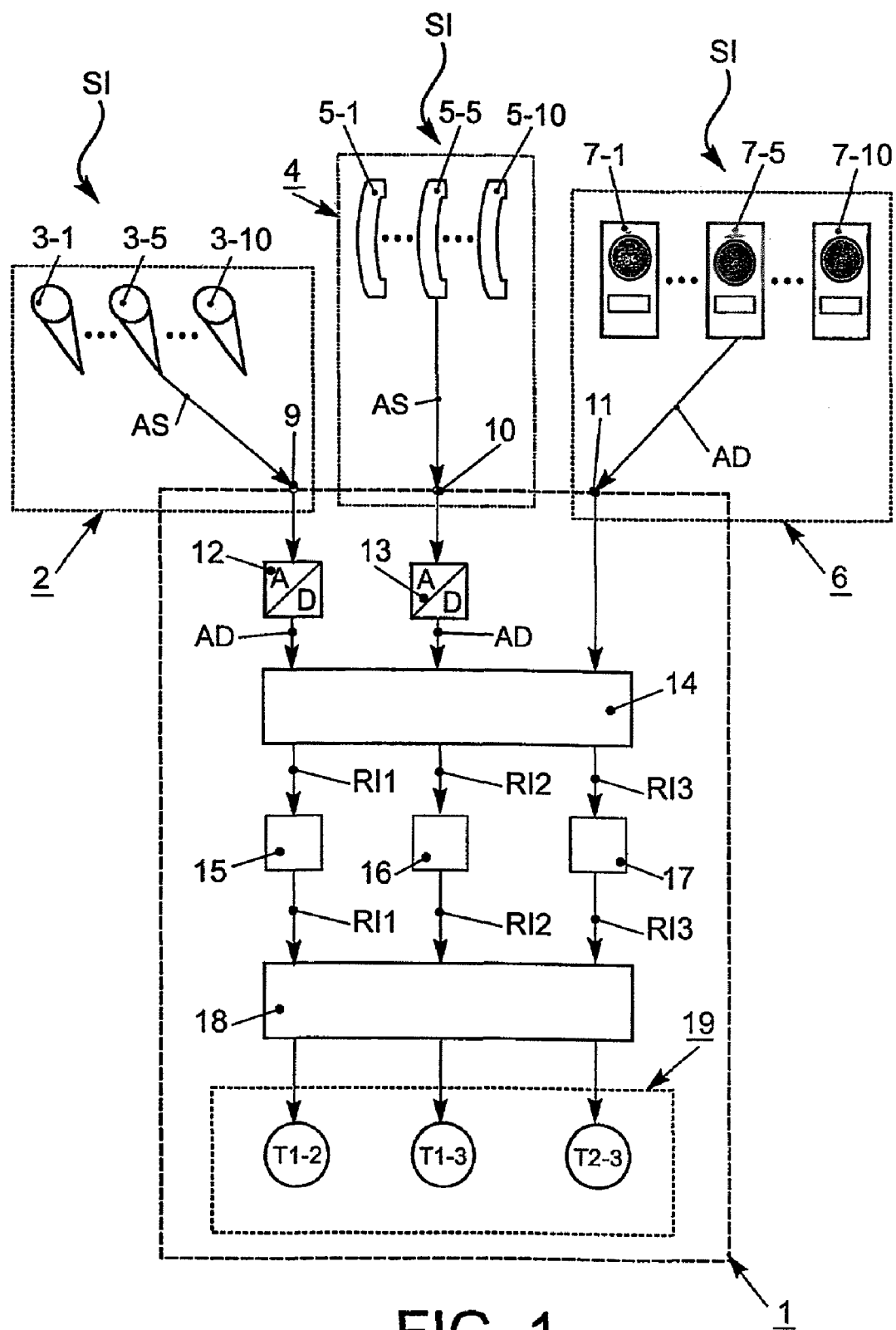

The invention relates to the field of speech recognition and more particularly to a method and device with speech reference transformation means.

Such a speech recognition device, speech recognition method, reference determining method and computer program product are known, for example, from U.S. Pat. No. storing reference information. The reference information is determined by a manufacturer of the speech recognition device during a reference determining method via an analysis of the type of pronunciation of words by a plurality of reference speakers. Each reference speaker hereto pronounces a certain word into a microphone and analysis means analyze so-called feature vectors from the speech information uttered into the microphone, which feature vectors describe the time pattern of frequency components of the reference speaker's speech information. By forming an average value of the feature vectors of all the reference speakers for the pronunciation of each phoneme of words of the text, the idiosyncrasies of the individual reference speakers are averaged and the thus determined reference information is suitable for a speaker-independent speech recognition device. Since the feature vectors of the speech information of the reference speakers also depend on the distortions of the input device (microphone, telephone . . . ) forming a receive channel, with the reference determining method the reference speakers use a microphone that causes the least possible distortions of the feature vectors of the speech information to occur. The reference information of the known speech recognition device stored in the reference storage means may be adapted by a user to the input device utilized by the user to improve the recognition rate of the speech recognition device. For this purpose, the known speech recognition device has receive channel adaptation means for adapting the reference information stored in the reference storage means to distortions caused by the input device, which distortions are made in frequency vectors of the speech information, which vectors are produced by the analysis means of the speech recognition device.

The reference information of the known speech recognition device stored in the reference storage means may further be adapted by the user of the speech recognition device to the type of pronunciation of words to additionally improve the recognition rate of the speech recognition device for this user. For this purpose, the known speech recognition device includes user adaptation means for adapting the reference information stored in the reference storage means and already adapted to the receive channel used by the user to the user's type of pronunciation of words. The reference information adapted to the receive channel and the user is then utilized by speech recognition means of the speech recognition device to determine text information to be assigned to the speech information or one of the feature vectors determined from the speech information, respectively.

With the known speech recognition device, speech recognition method, reference determining method and computer program product it has proved to be a drawback that the user, when using different input devices, is to adapt the reference information to each one of these input devices. This relates, for example, to a user who customarily dictates texts with a microphone connected to a computer, but sometimes gives commands to the computer by telephone and sometimes uses a digital dictating machine for dictating texts while being on the way, which texts are later to be recognized by the speech recognition device formed by the computer. When doing so, the user is to enter a predefined text with the respective input device for each one of his input devices to adapt the reference information to the user and the input device and to obtain a comparably good recognition rate when different input devices are used.

It is an object of the invention to eliminate the problems defined above and provide a speech recognition device, speech recognition method, reference determining method and computer program product of the type defined in the opening paragraph, in which the user no longer needs to adapt the reference information to different input channels. This object is achieved with such a speech recognition device in accordance with the measures of the characterizing part of claim 1, with such a speech recognition method in accordance with the measures of the characterizing part of claim 4, with such a reference determining method in accordance with the measures of the characterizing part of claim 7 and with such a computer program product in accordance with the measures of the characterizing part of claim 9.

This achieves that already with the reference determining method, in addition to the reference information adapted to a typical receive channel, a transformation matrix is determined for each further typical receive channel, to adapt the determined reference information to other typical receive channels. This offers the advantage that a user of the speech recognition device needs to adapt the reference information to the user's type of pronunciation of words only with one of these typical input devices to reach a practically uniformly good recognition rate with all these input devices. Reference transformation means then determine from this reference information adapted to the user and the typical receiving device reference information for further typical receiving devices or typical receive channels respectively, that can be used by the user. For example, for the following typical receive channels may be determined transformation matrices and adapted reference information for which the speech information is received by a microphone, a telephone over an analog or digital telephone network, a mobile telephone or by a digital dictating machine.

By the measures in accordance with claim 2 or claim 5, the reference information adapted to the user and to one of these typical receive channels is automatically adapted to all the other typical receive channels without a further action by the user.

By the measures as claimed in claim 3 or claim 6 the frequency sub-ranges of the speech information is expressed in feature vectors featuring these frequency sub-ranges to let the feature vectors give the best possible image of the frequency spectrum received from the respective receive channel. If, for example, a speech information signal having a frequency spectrum of up to 4 kHz is received from a typical receive channel, for describing the received speech information, no feature vectors are determined that describe the speech information in frequency sub-ranges with higher frequencies than 4 kHz.

The measures as claimed in claim 8 offer the advantage that the determined reference information or the determined transformation matrix describe the properties of a typical receive channel and peculiarities of an individual receive channel are filtered out. For example, twenty different digital dictating machines are used for the reference determining method to copy the receive channel of a typical digital dictating machine.

The invention will be explained in the following with reference to an example of embodiment shown in FIG. 1 of a transformation matrix generator and an example of embodiment shown in FIG. 2 of a speech recognition device that includes reference transformation means, whereas the invention is to be considered not restricted to these examples of embodiment.

Figure 2:
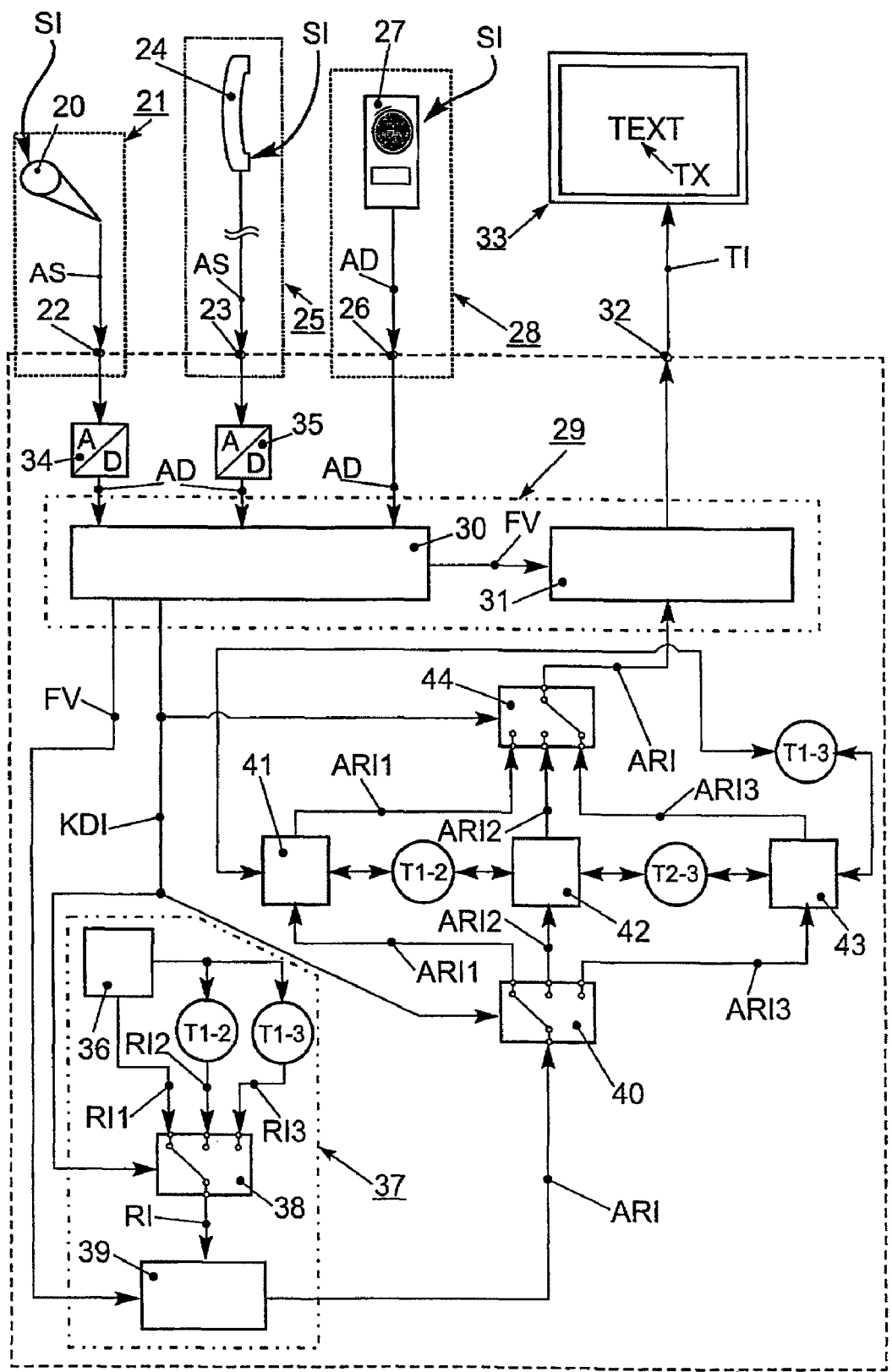

FIG. 1 diagrammatically shows in the form of a block diagram a computer with which reference determining software is executed and which here forms a transformation matrix generator for generating transformation matrices, and FIG. 2 diagrammatically shows in the form of a block diagram a computer and by which speech recognition software is executed and which here forms a speech recognition device that includes reference transformation means.

FIG. 1 shows a computer in whose main memory a first computer program product can be loaded, which includes software code sections and is formed by reference determining software. When the computer executes the reference determining software, the computer forms a transformation matrix generator 1 and works in accordance with a reference determining method. With the reference determining method is determined, on the one hand, reference information RI for three different typical receive channels and, on the other, transformation matrices T1-2, T1-3 and T2-3 for transforming the determined reference information RI of one of the typical receive channels into the determined reference information RI of another one of the typical receive channels.

First reference information RI1 is determined for a first typical receive channel 2, which is copied by ten different microphones 3-1 to 3-10. Furthermore, second reference information RI2 is determined for a second typical receive channel 4, which is copied by ten different telephone lines 5-1 to 5-10. In addition, third reference information RI3 is determined for a third typical receive channel 6, which channel is copied by ten different digital dictating machines 7-1 to 7-10. Each one of these typical receive channels 2, 4 and 6 has a different transmission property for speech information SI spoken by a user into one of the microphones 3, one of the telephones 5, or one of the digital dictating machines 6, as a result of which the speech information SI applied to the transformation matrix generator 1 is colored by the respective receive channel 2, 4 or 6 used.

The coloring of the speech information SI by the respective receive channel 2, 4 or 6 is caused by the fact that frequencies up to 8 kHz of the speech information SI are transmitted over the first receive channel 2, up to 3.7 kHz over the second receive channel 4 and up to 4 kHz over the third receive channel 6 and higher frequency portions of the speech information SI are not transmitted. In addition, the speech information SI is colored by the respective receive channel 2, 4 or 6, because individual frequency portions of the transmitted speech information SI are respectively strongly attenuated by the respective receive channel.

The first reference information RI1 of the first typical receive channel 2 and generated by the transformation matrix generator 1, and the determined transformation matrices T1-2, T1-3 and T2-3 form a part of speech recognition software which forms a second computer program product and which is executed by a computer shown in FIG. 2. When the computer executes the speech recognition software, the computer forms a speech recognition device 8 and works in accordance with a speech recognition method for recognizing text information TI, which can be assigned to speech information SI applied to the speech recognition device 8. During this process the speech recognition device 8 evaluates the first, second or third reference information RI.

The speech information SI spoken by a user and containing acoustic information can be described with approximately 40 phonemes, as this has been known for a long time. The speech recognition device 8 recognizes the text information TI to be assigned to a received speech information signal SI among other things from the fact that there is determined which of the 40 phonemes are contained in the speech information SI in what order. The acoustic information of each phoneme contained in the speech information SI is colored, however, by the input device or receive channel 2, 4 or 6 selected by the user for entering speech information SI. To obtain a high recognition rate of the speech recognition device 8, it is necessary for the speech recognition device 8 to evaluate, while the speech recognition method is being executed, the first, second or third reference information RI respectively, determined for the receive channel 2, 4 or 6 chosen by the user, to take the coloring of the speech information SI by the respective receive channel 2, 4 or 6 into account.

Each user pronounces a word and its phoneme slightly differently, because of which the acoustic information of each phoneme contained in the speech information SI also depends on the actual user of the speech recognition device 8. The first, second or third reference information RI is therefore adapted to the respective user by user adaptation means to achieve a very high recognition rate of the speech recognition device 8, which will be further discussed hereinbelow.

The transformation matrix generator 1 has a first audio terminal 9, a second audio terminal 10 and a third audio terminal 11. To the first audio terminal 9 and the second audio terminal 10 of the transformation matrix generator 1 can be applied an analog audio signal AS, which contains speech information SI. To the third audio terminal 11 of the transformation matrix generator 1 can be applied digital audio data AD which are also contained in speech information SI.

The transformation matrix generator 1 includes a first A/D converter 12 and a second A/D converter 13 for digitizing audio signals AS fed to the first audio terminal 9 and the second audio terminal 10. The speech information SI contained in the analog audio signal AS can be tapped as digital audio data AD from the first A/D converter 12 and the second A/D converter 13.

The transformation matrix generator 1 further includes analysis means 14 to which can be applied audio data AD delivered by the first and second A/D converters 12 and 13 respectively, and audio data AD from the third audio terminal 11. The analysis means 14 are used for analyzing the speech information SI contained in the applied audio data AD and for determining the reference information RI featuring the coloring of each of the 40 phonemes by the respective receive channel 2, 4 or 6.

For this purpose, the analysis means 14 determine every 10 milliseconds a feature vector containing 32 components. 16 of the 32 components of the feature vector describe the amplitude values of the speech information SI in 16 frequency ranges of the whole frequency range transmitted by the respective receive channel. The remaining 16 of the 32 components of the feature vector describe the change over time of the 16 amplitude values. Each of the 40 phonemes may be described by one such feature vector containing 32 components. To take the differences of the acoustic information of a phoneme in different surroundings (adjacent phonemes) into account, each one of the 40 phonemes is described by 400 typical samples of the phoneme feature vector that has 32 components.

The analysis means 14 thus determine, as a result of the analysis of a large number of audio data AD applied to the transformation matrix generator 1 over the first receive channel 2, 400 typical samples of the feature vectors containing 32 components as first reference information RI1 for each one of the 40 phonemes. Thus, a total of 400×32× 40=512,000 numerical values are determined by the analysis means 14 as first reference information RI1 for featuring the 40 phonemes colored by the first receive channel 2. Equally many numerical values are determined as second reference information RI2 by the analysis means 14 for featuring the 40 phonemes colored by the second receive channel 4 and as third reference information RI3 for featuring the 40 phonemes colored by the third receive channel 6.

Reference information RI, which is largely independent of the type of pronunciation of words by individual speakers and may also be referred to as speaker-independent reference information RI, is determined by the transformation matrix generator 1. For this purpose, a plurality of users speak a predefined text into the input devices 3, 5 and 7 in accordance with the reference determining method, to statistically average the differences of the individual speakers, as this is generally known. This is further discussed hereinafter with respect to an example of application of the transformation matrix generator 1.

The transformation matrix generator 1 further includes first reference storage means 15 for storing the first reference information RI1, second reference storage means 16 for storing the second reference information RI2 and third reference storage means 17 for storing the third reference information RI3. The transformation matrix generator 1 now includes further transformation matrix generating means 18, which are used for reading the reference information RI stored in the reference storage means 15, 16 and 17 and for comparing the 32-component feature vectors. As a result of the comparison of the transformation matrix generating means 18, they can determine the transformation matrices T1-2, T1-3 and T2-3, which have 32 rows and 32 columns for showing the 32-component feature vectors.

The transformation matrices T1-2, T1-3 and T2-3 determined by the transformation matrix generating means 18 have the property that from reference information RI1, RI2 and RI3 stored in the reference storage means 15, 16 and 17, with two of these three transformation matrices T1-2, T1-3 and T2-3, always the other two reference information signals RI1, RI2 and RI3 stored in the reference storage means can be determined. For example, by applying the transformation matrix T1-2 to the first reference information signal RI1 stored in the first reference storage means 15, the second reference information signal RI2 stored in the second reference storage means 16 can be computed. For the expert this description of the property of the transformation matrix T1-2 sufficiently discloses the transformation matrix T1-2 determined by the transformation matrix generating means 18. The transformation matrices T1-2, T1-3 and T2-3 determined by the transformation matrix generating means 18 can be stored in reference transformation means 19 of the transformation matrix generator 1.

In the following the generation of the transformation matrices T1-2, T1-3 and T2-3 is further explained with reference to an example of application of the transformation matrix generator 1 shown in FIG. 1. The reference determining method is executed by the computer of a company that develops speech recognition software for the speech recognition device 8. The company would like to determine reference information RI which is already adapted to typical input devices for the speech recognition device 8, thus to microphones 3, to telephones 5 and to digital dictating machines 7. Furthermore, the reference information RI and the transformation matrices T1-2, T1-3 and T2-3 are intended to be determined for the German language.

For this purpose, the company invites a total of 100 German-language speakers within several weeks, who read aloud a text for an hour and are also referred to as so-called reference speakers. The speech information SI then produced by the first ten speakers is applied to the microphone 3-1, the telephone 5-1 and the digital dictating machine 7-1, the speech information SI produced by the next ten speakers is applied to the microphone 3-2, the telephone 5-2 and the digital dictating machine 7-2 and the speech information SI produced by the respective further ten speakers is applied to the further microphones 3-3 to 3-10, further telephones 5-3 to 5-10 and further digital dictating machines 7-3 to 7-10, respectively.

Since each of these ten input devices of the receive channels 2, 4 and 6 has a slightly different transmission property, the analysis means 14 is supplied with audio data AD which are typical of the receive channels 2, 4 and 6. This offers the advantage that the transformation matrix generator 1 can determine reference information RI for typical input devices. As a result of the large number of speakers and the large amount of data in the audio data AD applied to the analysis means 14, the analysis means 14 determine speaker-independent reference information RI1, RI2 and RI3 adapted to the respective receive channel 2, 4 or 6.

For this purpose, the analysis means 14 determine, as described above, the time pattern of the 32-component feature vectors for the audio data AD supplied by the different receive channels 2, 4 and 6. The analysis means 14 then fix the 16 frequency sub-ranges of the feature vector for the receive channels 2, 4 and 6, so that the frequency range transmitted in the respective receive channel is optimally described by the feature vector. For example, the frequency range of up to 8 kHz transmitted in the first receive channel 2 is described by 8000 Hz/16=500 Hz frequency sub-ranges (0 to 500 Hz, 500 Hz to 1000 Hz, ... 7500 Hz to 8000 Hz) and the frequency range of up to 4 kHz transmitted in the third receive channel 6 is described by 4000 Hz/16=250 Hz frequency sub-ranges (0 to 250 Hz, 250 Hz to 500 Hz, ... , 3750 Hz to 4000 Hz).

This offers the advantage that each one of the 32-component feature vectors describes a frequency sub-range in which really audio data AD are received from the respective receive channel 2, 4 or 6. Advantageously, it is avoided that, for example, audio data AD received over the third receive channel 6, which contain speech information SI in the frequency range up to 4 kHz, are described by 8 components of the feature vector in frequency sub-ranges from 4 kHz to 8 kHz, in which there is no speech information SI at all.

The reference information RI1, RI2 and RI3, which the analysis means 14 determine for the three receive channels 2, 4 and 6, is stored in the reference storage means 15, 16 and 17 respectively. The transformation matrix generating means 18 then compute the transformation matrices T1-2, T1-3 and T2-3 as this was described above. In addition, it should be pointed out that a plurality of components of the feature vector of a phoneme of one of the reference information signals RI1, RI2 influence the result of a component of the feature vectors of this phoneme of the transformed reference information RI1, RI2 and RI3 during the transformation with one of the transformation matrices T1-2, T1-3 and T2-3, as a result of which the transformation matrices T1-2, T1-3 and T2-3 also contain numerical values outside the diagonals of the transformation matrices T1-2, T1-3 and T2-3. For example, during the transformation with the transformation matrix T1-3 the two components of the 400 samples of the feature vectors of a phoneme of the third reference information signal RI3, which components describe the frequency sub-range from 0 to 250 Hz and from 250 Hz to 500 Hz, influence the feature vector components of this phoneme of the first reference information signal RI1, which describe the frequency sub-range 0 Hz to 500 Hz.

By determining the transformation matrices T1-2, T1-3 and T2-3, which have 32 rows and 32 columns—thus a total of 1024 numerical values—the advantage is obtained that in the speech recognition software only the receive channel reference information RI having only the 512,000 numerical values and the transformation matrices T1-2, T1-3 and T2-3 having each only 1024 numerical values are to be stored to have reference information RI available for each one of the three receive channels 2, 4 and 6 for the speech recognition device 8 to execute the speech recognition method. The speech recognition software therefore advantageously needs to have relatively little memory space in the computer.

In addition, with the transformation matrices T1-2, T1-3 and T2-3 also the reference information RI of a receive channel 2, 4 or 6 already adapted to a user of the speech recognition device 8 can be directly used for one of the other receive channels 2, 4 or 6, which is highly advantageous. In the following description of the speech recognition device this is further paid attention to.

It may be observed that analysis means of a matrix generator could determine only the reference information RI1 for the first receive channel 2 and store it in the first reference storage means 15. These analysis means could then directly compare the audio data AD of the same text portions but which were received over different receive channels, to produce only a very small amount of reference information RI, which exclusively feature differences from the stored first reference information RI1. Transformation matrix generating means of this transformation matrix generator could directly determine corresponding transformation matrices T1-2, T1-3 and T2-3 from this reference information RI. This would lead to the advantage that determining all the 512,000 numerical values of the second reference information RI2 and all the 512,000 numerical values of the third reference information RI3 could be dispensed with.

It may be observed that also another number of components of a feature vector can be laid down by the analysis means 14 to describe the phoneme of the speech information SI contained in the audio data AD. For example, the speech information SI in the frequency range transmitted over the respective receive channel 2, 4 or 6 also subdivided into 8 or 64 frequency sub-ranges could also be described by one or two components of the feature vector per frequency sub-range.

It may be observed that the frequency range transmitted over a receive channel need not be subdivided uniformly into frequency sub-ranges, as described above. It is advantageous for frequency sub-ranges having lower center frequencies of the frequency sub-range to provide a smaller frequency spread, because also the human auditory system is more sensitive to lower frequencies. For example, the following center frequencies could be laid down for frequency sub-ranges in accordance with the following regulation: center frequency of the next frequency sub-range=center frequency of the frequency sub-range×1.5. For example, the following center frequencies beginning with a center frequency of 100 Hz could be determined: 100 Hz, 150 Hz, 225 Hz, 338 Hz, 506 Hz . . . (first frequency sub-range: 75 Hz to 125 Hz=50 Hz frequency spread; fourth frequency sub-range: 282 Hz to 422 Hz=140 Hz frequency spread).

In the following the structure and the way of operation of the speech recognition device 8 will be explained in more detail. Via a first audio terminal 22 the speech recognition device 8 can be supplied with speech information SI spoken by a user via a microphone 20, which forms a first receive channel 21. Furthermore, via a second audio terminal 23 the speech recognition device 8 can be supplied with speech information SI, which a user has spoken into a telephone 24 which, together with the telephone lines of the telephone network as far as the second audio terminal 23, forms a second receive channel 25. Finally, via a third audio terminal 26 the speech recognition device 8 can be supplied with a user's speech information SI, which the user has spoken into a digital dictating machine 27 and has recorded it therewith. The coloring of the speech information SI when being recorded, and subsequent reproduction by the digital dictating machine 27 then forms the transmission property of a third receive channel 28.

The speech recognition device 8 includes speech recognition means 29 which comprise analysis means 30 and recognition means 31. The speech recognition means 29 are arranged for recognizing text information TI to be assigned to the applied speech information SI. The text information TI determined by the speech recognition means 27 can be sent to a monitor 33 via a monitor terminal 32 and displayed by the monitor 33.

A speech information signal SI applied as an audio signal AS to the first audio terminal 22 of the speech recognition device 8 can be applied as digital audio data AD to the analysis means 30 via a first A/D converter 24. Similarly, the speech information signal SI fed as an audio signal AS to the second audio terminal 23 of the speech recognition device 8 can be supplied to the analysis means 30 as digital audio data AD via a second A/D converter 35. Furthermore, the audio data AD applied to the third audio terminal 26 of the speech recognition device 8 can be directly fed to the analysis means 30.

The analysis means 30 are now arranged for detecting from which of the three audio terminals 22, 23 or 26 the speech information SI is received and then form channel detection means. Channel detection information KDI featuring whether the user has given the speech information SI to the speech recognition device 8 via the microphone 20, the telephone 24 or the digital dictating machine 27, can be produced by the analysis means 30.

This offers the advantage that the speech recognition device 8 utilizes the reference information RI for the execution of the speech recognition method, which reference information RI is suitable for the receive channel 21, 25 or 28 selected by the user. This will be further explained hereinafter with reference to an example of application of the speech recognition device 8.

The analysis means 30 are furthermore arranged, just like the previously described analysis means 14 of the transformation matrix generator 1, for analyzing the audio data AD fed thereto and producing a feature vector FV which contains 32 components every 10 milliseconds, which vector describes the speech information SI contained in these audio data AD. Advantageously, the analysis means 30 determine the 16 frequency sub-ranges of the feature vector FV in dependence on the determined channel identification information KDI. Thus, for example, for audio data AD received over the third receive channel 28, 32, components of the feature vector are determined from 16 frequency sub-ranges with a frequency range of 250 Hz each, as this was described above. The feature vector FV determined by the analysis means 30 can be applied to the recognition means 31.

The recognition means 31 are arranged for executing a speech recognition method as this is known, for example, from the document WO 99/35640. When the speech recognition method is being executed, the recognition means 31 evaluate reference information RI stored in reference storage means of the speech recognition device 8 and adapted to the actual user and the actually used receive channel 21, 25 or 28. During the execution of a training method by the speech recognition device 8, the stored reference information adapted to typical receive channels is adapted to the actual user of the speech recognition device 8.

For adapting the first reference information RI1 of the first typical receive channel 2 stored in the reference storage means 36 and determined by the transformation matrix generator 1, the speech recognition device 8 includes user adaptation means 37. The user adaptation means 37 contain the first transformation matrix T1-2 generated by the transformation matrix generator 1 for transforming the first reference information RI1 into the second reference information RI2, and the second transformation matrix T1-3 for transforming the first reference information RI1 into the third reference information RI3.

To a first switch 38 can be applied the first reference information RI1 from the reference storage means 36, the second reference information RI2 determined with the first transformation matrix T1-2, and the third reference information RI3 determined with the second transformation matrix T1-3. To the first switch 38 may further be applied the channel detection information KDI by the analysis means 30. One of the three reference information signals RI1, RI2 or RI3 can be applied to comparing means 39 of the user adaptation means 37 by the first switch 38, depending on channel detection information KDI applied thereto. The analysis means 30 and the first switch 38 then form receive channel adaptation means for adapting the stored reference information RI to the receive channel 21, 25 or 28 selected by the user.

The analysis means 30 can supply the feature vector FV of the audio data AD to the comparing means 39 every 10 milliseconds, which audio data were applied to the speech recognition device 8 during the execution of the training method and were analyzed by the analysis means 30. During the execution of the training method the comparing means 39 are arranged for comparing the feature vectors FV of individual phonemes applied thereto with the 400 typical samples of the feature vectors of phonemes of the reference information RI applied thereto. Results of the comparison of the feature vectors FV are evaluated for adapting the reference information RI to the respective idiosyncrasies of the pronunciation of the actual user of the speech recognition device 8.

The reference information ARI adapted to the user by the user adaptation means 37 can be stored via a second switch 40 in first adapted reference storage means 41, second adapted reference storage means 42 or third adapted reference storage means 43, depending on the receive channel 21, 25 or 28 selected by the user for the adaptation of the reference information RI to the user. The adapted reference storage means 41, 42 and 43 together form reference storage means for storing the reference information ARI adapted to the actual user of the speech recognition device 8 and to one of the respective receive channels 21, 25 and 28. For conveying the reference information ARI adapted to the user and to one of the receive channels 21, 25 and 28 to the respectively adapted reference storage means 41, 42 or 43, the channel identification information KDI can be applied to the second switch 40 by the analysis means 30.

The adapted reference information ARI1, ARI2 or ARI3 stored in one of the adapted reference storage means 41, 42 or 43, adapted during the execution of the training method for one of the receive channels 21, 25 or 28 and the user, can be transformed by means of the transformation matrices T1-2, T1-3 and T2-3 by the transformation matrix generator 1 and to the other reference information ARI1, ARI2 and ARI3 adapted to the user and can be stored in the other adapted reference storage means 41, 42 or 43. The transformation matrixes T1-2, T1-3 and T2-3 then form reference transformation means for transforming the adapted reference information ARI.

The speech recognition device 8 includes a third switch 44 to which also the channel detection information KDI can be applied and via which the reference information ARI adapted to the user and to the receive channel 21, 25 or 28 used by the user can be applied to the recognition means 31 when these means 31 execute the speech recognition method. The analysis means 30 and the third switch 44 form receive channel adaptation means for adapting the stored reference information ARI to the receive channel 21, 25 or 28 selected by the user.

In the following will be further explained with the aid of an example of embodiment of the execution of the training method with the speech recognition device 8 how the speaker-independent reference information RI determined by the transformation matrix generator 1 is adapted to the reference information ARI adapted to the actual user of the speech recognition device 8. According to the example of application it is assumed that Mr. Smith would like to utilize the speech recognition device 8 first for dictating texts. To improve the recognition rate of the speech recognition device 8, the manual of the speech recognition device 8 advises to adapt the device 8 to the user.

Mr. Smith then activates the training method of the speech recognition device 8 and speaks a training text given in the manual into the microphone 20, which text is also stored in the comparing means 39. The speech information SI of the spoken training text reaches the analysis means 30 via the first audio terminal 22 and the first A/D converter 34, which analysis means apply respective feature vectors FV to the comparing means 39. The analysis means 30 further apply the channel detection information KDI featuring the first receive channel 21 to the first switch 38, after which the first switch 38 connects the comparing means 39 to the first reference storage means 36.

In the first reference storage means 36 is stored the first reference information RI1 adapted by the transformation matrix generator 1 for a typical microphone receive channel—thus the first receive channel 2. The comparing means 39 determine the type of pronunciation of each phoneme by Mr. Smith based on the feature vectors FV determined by the analysis means 30 and the training text known to the comparing means 39, and adapt the first reference information RI accordingly to Mr. Smith. The first adapted reference information ARI1 adapted to Mr. Smith and the first receive channel 21 and determined by the comparing means 39 is then stored in the first adapted reference storage means 41 via the second switch 40.

At the end to the training method the first adapted reference information ARI1 is transformed with the first transformation matrix T1-2 into the second adapted reference information ARI2 adapted to the second receive channel 25 and Mr. Smith and stored in the second adapted reference storage means 42. Likewise, the third adapted reference information ARI3 adapted to the third receive channel 28 and Mr. Smith is determined with the second transformation matrix T1-3 and stored in the third adapted reference storage means 43.

The training method described above offers the advantage that the user of the speech recognition device 8 can adapt the speech recognition device 8 via one of the possible receive channels 21, 25 or 28 to the pronunciation of this user and also the reference information RI for the other receive channels 21, 25 or 28 is automatically adapted, and a good recognition rate of the speech recognition method is obtained also for these receive channels.

It may be observed that Mr. Smith could have executed the training method also from another location by telephone 24. In that case the second reference information RI2 transformed from the first reference information RI1 with the first transformation matrix T1-2 would have been adapted by the comparing means 39 and stored as adapted second reference information ARI2 in the second adapted reference storage means 42. The first adapted reference information ARI1 transformed with the first transformation matrix T1-2 would then have been stored in the first adapted reference storage means 41 and the third adapted reference information ARI3 transformed with the third transformation matrix T2-3 would then have been stored in the third adapted reference storage means 43.

From this the advantage is clearly evident that the speech recognition device 8 can be trained over an arbitrary one of the receive channels 21, 25 and 28 and then be adapted to the user for all the receive channels.

In the following the advantages of the speech recognition device 8 are further explained by way of an example of embodiment of the execution of the speech recognition method by the speech recognition device 8. According to the example of embodiment it is assumed that Mr. Smith, while traveling, has made a dictation with the digital dictating machine 27. Arrived home Mr. Smith connects the dictating machine 27 to the third audio terminal 26, actuates the display key of the dictating machine 27 and activates the speech recognition method of the speech recognition device 8.

The analysis means 30 then apply respective feature vectors FV to the recognition means 31 and channel detection information KDI featuring the third receive channel 28 to the third switch 44. The third switch 44 then connects the third adapted reference storage means 43 to the recognition means 31. During the execution of the speech recognition method the recognition means 31 thus evaluate the reference information ARI3 adapted to Mr. Smith and to a typical receive channel of a dictating machine and send text information TI corresponding to the speech information SI to the monitor 33 via the monitor terminal 32.

This advantageously achieves that although the speech recognition device 8, while executing the training method, was adapted to Mr. Smith by the microphone 20, the recognition rate of the speech recognition method with speech information SI entered by Mr. Smith via the dictating machine 27 is extremely high. Likewise, the speech recognition method has a high recognition rate for commands given to the computer by Mr. Smith by telephone 24.

It may be observed that comparably high recognition rates can also be achieved with all the other combinations such as, for example, when the speech recognition device 8 is trained with the second receive channel 25 and is subsequently used for recognizing the text information TI received by the first receive channel 21 and to be assigned to the speech information SI. Extremely advantageous, however, is training the speech recognition device 8 with the microphone 20, because with most microphones the speech information SI is transmitted in a relatively high frequency range (up to 8 kHz). It would thus also be possible to omit the first transformation matrix T1-2 and the second transformation matrix T1-3 from the user adaptation means 37 and, when the training method is executed, to request the input of the speech information SI of the training text by the user via the microphone 20. In that case also the third transformation matrix T2-3 could be omitted for the transformation of the second adapted reference information ARI2 to the third adapted reference information ARI3, and vice versa.

It may be observed that the transformation matrix generator 1 could also determine reference information for a typical receive channel of a mobile telephone, or of a telephone 5 connected to the second audio terminal 10 via a digital or an analog telephone network. The expert is familiar with a multitude of further possible typical receive channels.

It may be observed that from the transformation matrices T1-2, T1-3 and T2-3 also inverse transformation matrices could be determined, by which the audio data AD passed on to the analysis means 30 could be preprocessed before being analyzed by the analysis means 30 as described above.

It may be observed that the reference determining method need not be executed by a computer of the manufacturer of the speech recognition software, but may also form part of the speech recognition software and can be executed on the computer of the user of the speech recognition device. During the execution of the speech recognition method information about the actually used receive channel, which information is determined by the recognition means, could be used for adapting the reference information and for determining transformation matrices or inverse transformation matrices.

The invention claimed is:

1. A speech recognition device (8) to which can be applied via a first receive channel (21) and a second receive channel (25, 28) speech information (SI) colored by the respective receive channel (21, 25, 28), wherein the device used on the first channel is different that the device used on the second channel, the speech recognition device comprising:
   reference storage means (36) for storing reference information (RI1) featuring the type of pronunciation of words by a plurality of reference speakers and
   receive channel adaptation means (30, 38, 44) for adapting the stored reference information (RI, ARI) to the first or second receive channel (21, 25, 28) used by a user, wherein the first reference information (RI1, ARI1) and the second reference information (RI2, RI3, ARI2, ARI3) is formed by feature vectors (FV), while each feature vector (FV) features the speech information (SI) in a respective frequency sub-range, and in that the feature vectors (FV) of the first reference information (RI1, ARI1) feature the speech information (SI) in different frequency sub-ranges from the feature vectors (FV) of the second reference information (RI1, RI3, ARI2, ARI3); and
   user adaptation means (37) for adapting the stored reference information (RI1, RI2, RI3) to the type of pronunciation of words by the user of the speech recognition device (8;) and
   speech recognition means (29) for recognizing text information (TI) to be assigned to the supplied speech information (SI), while reference information (ARI1, ARI2, ARI3) adapted by the receive channel adaptation means (30, 38, 44) and the user adaptation means (37) is evaluated, characterized in that the receive channel adaptation means (30, 38, 44) include reference transformation means (T1-2, T1-3, T2-3) which are arranged for transforming first reference information (RI1, ARI1) adapted to the first receive channel (21) into second reference information (RI2, RI3, ARI2, ARI3) adapted to the second receive channel (25, 28) in accordance with a transformation matrix (T1-2, T1-3, T2-3), while the adapted first reference information (RI1, ARI1) to be transformed by the reference transformation means (T1-2, T1-3, T2-3) may, but need not, already have been adapted to the user by the user adaptation means (37).

2. A speech recognition device (8) as claimed in claim 1, characterized in that channel detection means (30) are provided which are arranged for detecting the first receive channel (21) or second receive channel (25, 28) selected by the user for entering speech information (SI), and in that selection means (44) are provided which are arranged for selecting first reference information (ARI1) or second reference information (ARI2, ARI3) adapted to the selected first receive channel (21) or second receive channel (25, 28) for evaluation by the speech recognition means (29).

3. A speech recognition method (8) of recognizing text information (TI) to be assigned to speech information (SI), where the speech information (SI) is colored by a first receive channel (21) or a second receive channel (25, 28) and the speech recognition method (8) includes the following steps:
  adapting (30, 38, 44) reference information (RI1, RI2, RI3) that features the type of pronunciation of words by a plurality of reference speakers to the first or second receive channel (21, 25, 28) used by a user, wherein the first reference information (RI1, ARI1) and the second reference information (RI2, RI3, ARI2, ARI3) is formed by feature vectors (FV), while each feature vector (FV) features the speech information (SI) in a respective frequency sub-range, and in that the feature vectors (FV) of the first reference information (RI1, ARI1) feature the speech information (SI) in different frequency sub-ranges from the feature vectors (FV) of the second reference information (RI1, RI3, ARI2, ARI3); and
  adapting (37) the reference information (RI1, RI2, RI3) to the type of pronunciation of words by the user of the speech recognition method; and
  recognizing the text information (TI) to be assigned to the speech information (SI), while the reference information (ARI1, ARI2, ARI3) adapted to the first receive channel (21) or the second receive channel (25, 28) and to the user is evaluated, characterized in that first reference information (RI1, ARI1) adapted to the first receive channel (21) is transformed into second reference information (RI2, RI3, ARI2, ARI3) adapted to the second receive channel (25, 28), while the adapted first reference information (RI1, ARI1) to be transformed may, but need not, already have been adapted to the user.

4. A speech recognition method (8) as claimed in claim 3, characterized in that there is detected (30) which of the receive channels (21, 25, 28) was selected by the user for entering the speech information (SI) and in that the first reference information (ARI1) or second reference information (ARI2, ARI3) adapted to the selected receive channel (21, 25, 28) is used for the evaluation by the speech recognition means (29).

5. A reference determining method (1) of determining first reference information (RI1) adapted to a first receive channel (2) for a speech recognition method (8), while the reference determining method (1) includes the following steps:
  analyzing (14) speech information (SI) received from a plurality of first reference speakers over the first receive channel (2), each reference speaker using substantially similar input device and
  producing the first reference information (RI1) adapted to the first receive channel (2), characterized in that speech information (SI) received from a plurality of second reference speakers using substantially similar input devices over a second receive channel (4, 6) is analyzed, wherein the first reference information (RI1, ARI1) and the second reference information (RI2, RI3, ARI2, ARI3) is formed by feature vectors (FV), while each feature vector (FV) features the speech information (SI) in a respective frequency sub-range, and in that the feature vectors (FV) of the first reference information (RI1, ARI1) feature the speech information (SI) in different frequency sub-ranges from the feature vectors (FV) of the second reference information (RI1, RI3, ARI2, ARI3); and a transformation matrix (T1-2, T1-3) is determined for transforming the first reference information (RI1) into second reference information (RI2, RI3) adapted to the second receive channel (4, 6), wherein said devices used by the plurality of second reference speakers are different than those used by the plurality of first reference speakers.

6. A reference determining method (1) as claimed in claim 5, characterized in that for determining the first reference information (RI1) and the transformation matrix (T1-2, T1-3, T2-3) the first receive channel (2) and the second receive channel (4, 6) are formed by a plurality of terminal units (3, 5, 7), which are typical of the first receive channel (2) and the second receive channel (4, 6).

7. A computer program product (1, 8) which can be directly loaded into the internal memory of a digital computer and includes software code sections suitable for execution by the computer for recognizing text information (121) to be assigned to speech information (SI), where the speech information (SI) is colored by the input devices used on a first receive channel (21) or a second receive channel (25, 28), wherein the input device used on the first channel is different than the input device used on the second channel by the following steps:
  adapting (30, 38, 44) reference information (RI1, RI2, RI3) that features the type of pronunciation of words by a plurality of reference speakers to the first or second receive channel (21, 25, 28) used by a user, wherein the first reference information (RI1, ARI1) and the second reference information (RI2, RI3, ARI2, ARI3) is formed by feature vectors (FV), while each feature vector (FV) features the speech information (SI) in a respective frequency sub-range, and in that the feature vectors (FV) of the first reference information (RI1, ARI1) feature the speech information (SI) in different frequency sub-ranges from the feature vectors (FV) of the second reference information (RI1, RI3, ARI2, ARI3); and
  adapting (37) the reference information (RI1, RI2, RI3) to the type of pronunciation of words by the user of the speech recognition method; and
  recognizing the text information (TI) to be assigned to the speech information (SI), while the reference information (ARI1, ARI2, ARI3) adapted to the first receive channel (21) or the second receive channel (25, 28) and to the user is evaluated, characterized in that first reference information (RI1, ARI1) adapted to the first receive channel (21) is transformed into second reference information (RI2, RI3, ARI2, ARI3) adapted to the second receive channel (25, 28), while the adapted first reference information (RI1, ARI1) to be transformed may, but need not already have been adapted to the user.

8. A computer program product as claimed in claim 7, characterized in that it is stored on a medium that can be read by a computer.

9. A computer program product (1, 8) which can be directly loaded into the internal memory of a digital computer and includes software code sections suitable for execution by the computer for:

analyzing (14) speech information (SI) received from a plurality of first reference speakers over the first receive channel (2), each reference speaker using substantially similar input device and producing the first reference information (RI1) adapted to the first receive channel (2), characterized in that speech information (SI) received from a plurality of second reference speakers using substantially similar input devices over a second receive channel (4, 6) is analyzed, wherein the first reference information (RI1, ARI1) and the second reference information (RI2, RI3, ARI2, ARI3) is formed by feature vectors (FV), while each feature vector (FV) features the speech information (SI) in a respective frequency sub-range, and in that the feature vectors (FV) of the first reference information (RI1, ARI1) feature the speech information (SI) in different frequency sub-ranges from the feature vectors (FV) of the second reference information (RI1, RI3, ARI2, ARI3); and a transformation matrix (TI-2, TI-3) is determined for transforming the first reference information (RI1) into second reference information (RI2, RI3) adapted to the second receive channel (4, 6), wherein said devices used by the plurality of second reference speakers are different than those used by the plurality of first reference speakers.

10. A computer program product as claimed in claim 9, characterized in that it is stored on a medium that can be read by a computer.

\* \* \* \* \*